(12) United States Patent
Schwalm et al.

(10) Patent No.: US 6,242,101 B1
(45) Date of Patent: Jun. 5, 2001

(54) RADIATION-CURABLE FORMULATIONS

(75) Inventors: Reinhold Schwalm, Wachenheim; Rainer Königer, Ludwigshafen; Erich Beck, Ladenburg; Klaus Menzel, Möglingen; Wolfgang Paulus, Mainz; Peter Enenkel, Hessheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/283,864

(22) Filed: Apr. 1, 1999

(30) Foreign Application Priority Data

Apr. 2, 1998 (DE) .............................. 198 14 872

(51) Int. Cl.$^7$ .......................... C08F 2/46; C08F 208/18; C09D 133/08; C09D 133/10; B32B 27/40
(52) U.S. Cl. .................................. 428/425.8; 428/423.1; 522/96; 522/173; 522/174
(58) Field of Search .............................. 522/96, 103, 107, 522/182, 174, 173; 428/423.1, 425.8

(56) References Cited

U.S. PATENT DOCUMENTS

| 4,264,483 | | 4/1981 | Laufer et al. . |
| 4,382,102 | * | 5/1983 | Noomen . |
| 4,668,550 | | 5/1987 | Tajima et al. . |
| 4,855,334 | * | 8/1989 | Maruyama et al. . |
| 5,132,367 | * | 7/1992 | Chan . |
| 5,250,391 | | 10/1993 | Miller . |
| 5,442,090 | * | 8/1995 | Beck et al. . |
| 5,483,004 | * | 1/1996 | Hoffman et al. . |
| 5,527,859 | | 6/1996 | Kempter et al. . |

FOREIGN PATENT DOCUMENTS

| 2 537 783 | 3/1976 | (DE) . |
| 0 324 480 | 7/1989 | (EP) . |
| 0 650 979 | 5/1995 | (EP) . |
| 1138117 | 12/1968 | (GB) . |
| 62-047842 | 3/1987 | (JP) . |
| WO 92/17337 | 10/1992 | (WO) . |

OTHER PUBLICATIONS

Chemical Abstracts, AN 107: 136038d, JP 62–110779, May 21, 1987.
Chemical Abstracts, AN 87–203386/29, JP 62–132,568, Jun. 15, 1987.
N.S. Allan, et al., Chemistry & Technology of UV & EB Formulations For Coatings, Inks & Paints, vol. II, pp. 31–68, 73–123, and 208–214, 1991.

* cited by examiner

Primary Examiner—Susan W. Berman
(74) Attorney, Agent, or Firm—Oblon, Spivak, McClelland, Maier & Neustadt, P.C.

(57) ABSTRACT

Radiation-curable formulations based on ethylenically unsaturated prepolymers and difunctional esters of ethylenically unsaturated carboxylic acids with diols having a linear alkylene chain of 7 to 14 carbon atoms, a process for coating substrates using these radiation-curable formulations, and their use as automotive topcoats.

11 Claims, No Drawings

RADIATION-CURABLE FORMULATIONS

RADIATION-CURABLE FORMULATIONS

The present invention relates to radiation-curable formulations which comprise at least one prepolymer having at least two olefinic double bonds per molecule and at least one difunctional ester of α,β-ethylenically unsaturated carboxylic acids with diols having a linear alkylene chain which has 7 to 14 carbon atoms.

Radiation-curable compositions have acquired widespread importance in the art, especially as high-grade surface coating materials. By radiation-curable compositions are meant formulations which include ethylenically unsaturated polymers or prepolymers and which, directly or after a physical drying step, are cured by exposure to high-energy radiation; for example, by irradiation with UV light or by irradiation with high-energy electrons (electron beams).

Particularly high-grade coatings are obtained on the basis of polyfunctional α,β-ethylenically unsaturated polymers or prepolymers. Such ethylenically unsaturated prepolymers are known from P. K. T. Oldring (ed.), Chemistry and Technology of UV- and EB-Formulations for Coatings, Inks and Paints, Vol. II, SITA Technology, London 1991, on the basis, for example, of epoxy acrylates (pp. 31–68), urethane acrylates (pp. 73–123) and melamine acrylates (pp. 208–214).

Ethylenically unsaturated compounds of low molecular mass are often added to such compositions in order to reduce their viscosity. Like the ethylenically unsaturated polymers and prepolymers, said compounds are polymerized in the course of curing and so are incorporated into the coating. They are therefore referred to as reactive diluents. The properties of the resulting coatings are therefore determined both by the ethylenically unsaturated polymer or prepolymer employed and by the reactive diluent. Furthermore, for optimum coating properties, it is necessary to harmonize the ethylenically unsaturated polymers or prepolymers with the reactive diluents.

Because of their advantageous processing properties, radiation-curable formulations have become established for the coating of wood, paper and plastics in the interior applications segment. Exterior application, on the other hand, is still tied up with problems because of the high caliber of requirements it imposes on the weathering stability of such radiation-curable formulations.

The prior art discloses a large number of radiation-curable formulations which comprise, as monomers, oligomers or reactive diluents, multifunctional acrylates based on diols or polyols. For instance, GB-B-1 138 117 describes radiation-curable coating materials based on unsaturated polyester resins, with styrene and methyl methacrylate as reactive diluent. JP 62 110 779 and JP 62 132 568 likewise disclose radiation-curable coating materials, based on urethane oligomers and trifunctional reactive diluents. A series of further patents describes the use of such radiation-curable formulations for optical applications, examples being U.S. Pat. No. 5,250,391 for holograms, EP-A-324 480 for refractive index imaging and JP 62 047 842 for optical disks. These formulations, however, are not intended for exterior applications, or comprise radiation-curable prepolymers or resins of high molecular mass.

The use of 1,6-hexanediol diacrylate as a reactive diluent is known from WO 92/17337 and DE 25 37 783 A. In formulations, it produces good gloss stability under weathering conditions (N. Round et al., Radiation Curing Conference Proceedings (1986)), and yet Radiat. Curing (1984), 11 (3), 24–30, 32/3 describes how the physical properties of hydrocarbon-based diol diacrylates are poorer than those of glycol ether-based diol diacrylates, especially as regards hardness and abrasion characteristics. In addition, radiation-curable formulations based on aliphatic urethane acrylates and 1,6-hexanediol diacrylate show signs of incompatibility with substrates, for example, comprising plastics such as PMMA, polycarbonate and acrylonitrile-styrene polymers, said incompatibility being manifested in incipient dissolution of the substrate and an associated deterioration in the properties.

A fundamental problem with the prior art radiation-curable compositions is that, although individual application properties such as coating hardness, flexibility and weathering stability can be improved by selecting and harmonizing the components (prepolymer and reactive diluent), this is always at the expense of other application properties. It is an object of the present invention, therefore, to provide radiation-curable compositions which, without the addition of inert organic solvents, combine good processing properties with good properties of the coating. In particular, it is intended that the formation should have good reactivity and high substrate compatibility in conjunction with good mechanical strength and high weathering stability and chemical resistance.

We have found that this object can, surprisingly, be achieved by a radiation-curable formulation which comprises at least one prepolymer having at least two olefinic double bonds per molecule and at least one difunctional ester of α,β-ethylenically unsaturated carboxylic acids with diols having a linear alkylene chain which has 7 to 14 carbon atoms.

The present invention therefore provides radiation-curable formulations which comprise i) at least one prepolymer which comprises at least two olefinic double bonds per molecule (component A), and ii) at least one diester of α,β-ethylenically unsaturated carboxylic acid with diols having a linear alkylene chain which has 7 to 14 carbon atoms (component B).

In general, the compositions of the invention contain from 20 to 90% by weight, preferably from 30 to 80% by weight and, in particular, from 40 to 70% by weight of component A, from 10 to 80% by weight, preferably from 20 to 60% by weight and, in particular, from 30 to 50% by weight of component B, and up to 20% by weight, based on the overall weight of components A and B, of customary additives.

In general, component A is composed of one or more structural elements which function as carriers for the structural units comprising olefinic double bonds. Suitable structural elements include aliphatic urethanes based on diisocyanates and suitable monools, diols and polyols, dimers and trimers of diisocyanates, melamine-formaldehyde adducts, polyetherpolyols, cooligomers of unsubstituted or substituted vinylaromatic compounds with α,β-ethylenically unsaturated carboxylic acids and/or their derivatives, and other groups suitable for synthesizing a prepolymer.

A prepolymer (component A) having at least two unsaturated double bonds is obtained by combining the above-mentioned structural elements with suitable structural units carrying α,β-ethylenically unsaturated double bonds. Such structural units include, in particular, vinyl- or allyl-functional hydroxyalkanes, vinyl or allyl esters of aliphtic, functionalized carboxylic acids, and esters of α,β-ethylenically unsaturated carboxylic acids with diols and polyols.

Accordingly, examples of suitable prepolymers (components A) are urethane oligomers, preferably aliphatic urethane oligomers having at least two olefinic double bonds, with aliphatic structural elements comprising not only alkylene groups, preferably those having 4 to 10 carbon atoms, but also cycloalkylene groups having preferably 6 to 20 carbon atoms, it being possible for both the alkylene and the cycloalkylene units to be substituted one or more times by $C_1$–$C_4$-alkyl, especially methyl, or to include one or more nonadjacent oxygen atoms.

Such prepolymers with urethane and/or urea groups that are suitable as components A are obtainable by reacting di-, tri- and polyfunctional isocyanate compounds with α,β-ethylenically unsaturated compounds which in addition have at least one isocyanate-reactive group, examples being OH groups or NH groups.

The difunctional isocyanate compounds are usually selected from aliphatic, aromatic and cycloaliphatic diisocyanates. In general, they have 4 to 22 carbon atoms. In particular, they comprise tetramethylene diisocyanate, hexamethylene diisocyanate, (1,6-diisocyanatohexane), octamethylene diisocyanate, decamethylene diisocyanate, dodecamethylene diisocyanate, tetradecamethylene diisocyanate, trimehylhexane diisocyanate or tetramethylhexane diisocyanate, 1,4-, 1,3- or 1,2-diisocyanato-cyclohexane, 4,4'-di(isocyanatocyclohexyl)methane, 1-isocyanato-3,3,5-trimethyl-5-(isocyanatomethyl)cyclohexane (isophorone diisocyanate), 2,4- or 2,6-diisocyanato-1-methyl-cyclohexane, 2,4-diisocyanatotoluene, 2,6-diisocyanatotoluene, tetramethylxylylene diisocyanate, 1,4-diisocyanatobenzene, 4,4'- and 2,4-diisocyanatodiphenylmethane, p-xylylene diisocyanate, and isopropenyldimethyltolylene diisocyanate. Preference is given, however, to the aliphatic and cycloaliphatic diisocyanates. Suitable trifunctional isocyanate compounds A include both compounds having a defined empirical formula and having 3 NCO groups per molecule and oligomers of low molecular mass, having a number-average molecular weight $M_n$ of <1000, which contain on average about 3.0 isocyanate groups per oligomer molecule. Particularly suitable trifunctional isocyanate compounds are the isocyanurates and biurets of said diisocyanates, and also the adducts of said diisocyanates with trifunctional alcohols such as glycerol, trimethylolethane, trimethylolpropane etc., or triamines. By reacting diisocyanates with polyols or polyamines it is possible in the same way to obtain polyfunctional isocyanate compounds. Preferred isocyanate compounds are the isocyanurates and biurets, especially the isocyanurates.

Further examples of polyisocyanates are isocyanurate-functional polyisocyanates, biuret-functional polyisocyanates, urethane- and allophanate-functional polyisocyanates, oxadiazinetrione-functional polyisocyanates, uretonimine-modified polyisocyanates, or mixtures thereof. The isocyanurate-functional polyisocyanates are, in particular, simple trisisocyanato isocyanurates - cyclic trimers of the diisocyanates—or mixtures of their higher homologs, having more than one isocyanurate ring.

In general, α,β-ethylenically unsaturated structural units for reaction with the di-, tri- and polyfunctional isocyanate compounds to form α,β-ethylenically unsaturated prepolymers as components A are selected from the esters of ethylenically unsaturated carboxylic acids such as acrylic, methacrylic, crotonic, acrylamidoglycolic, methacrylamidoglycolic and vinylacetic acid with a diol or polyol having preferably 2 to 20 carbon atoms, such as ethylene glycol, diethylene glycol, triethylene glycol, 1,2-propylene glycol, 1,3-propylene glycol, diethylene glycol, triethylene glycol, dipropylene glycol, tripropylene glycol, 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, glycerol, trimethylolethane, trimethylolpropane, trimethylolbutane, pentaerythritol, ditrimethylolpropane, erythritol and sorbitol, with the proviso that the ester has at least one isocyanate-reactive OH group. Further candidates for use are the amides of the abovementioned ethylenically unsaturated carboxylic acids with amino alcohols, such as 2-aminoethanol, 3-amino-1-propanol, 1-amino-2-propanol or 2-(2-aminoethoxy)ethanol, and also the vinyl, allyl and methallyl ethers of the abovementioned diols and polyols, provided they still have one free OH group. Preference is given to the esters of acrylic or methacrylic acid, such as 2-hydroxyethyl and hydroxypropyl (meth)acrylates, 1,4-butanediol and neopentyl glycol mono(meth)acrylates, trimethylolpropane mono- and di(meth)acrylate and pentaerythritol di- and tri(meth)acrylate. With particular preference, the esters are selected from 2-hydroxyethyl acrylate, hydroxypropyl acrylate, and 1,4-butanediol monoacrylate. Examples of amides of ethylenically unsaturated carboxylic acids with amino alcohols are 2-hydroxyethylacrylamide and -methacrylamide, 2- and 3-hydroxypropyl (meth)acrylamide, and 5-hydroxy-3-oxopentyl (meth)acrylamide. Particular preference as component A is given, accordingly, to urethane acrylates and urethane methacrylates of isocyanurates and biurets, especially urethane acrylates formed from isocyanurates or biurets and hydroxyethyl acrylate, hydroxypropyl acrylate and 1,4-butanediol monoacrylate. Very particular preference as components A is given to said urethane acrylates and urethane methacrylates when they have on average from two to three olefinic double bonds per molecule.

In general, the components A based on urethane derivatives or urea derivatives have no free isocyanate groups. This is customarily achieved by reacting the NCO groups of the isocyanate compounds with an at least equimolar amount of OH and/or NH groups, with at least 0.3 mol of OH and/or NH groups per mole of isocyanate groups being contributed by the α,β-ethylenically unsaturated structural units. Customarily, the proportion of OH and/or NH groups of the α,β-ethylenically unsaturated structural units among the total of OH and/or NH groups reacted lies within the range from 30% to 100%, in particular from 50% to 90% and, with very particular preference, in the range from 60% to 80%. Accordingly, from 0 to 70%, preferably from 10 to 50% and, with particular preference, from 20 to 40% of the total number of OH and/or NH groups reacted with isocyanate groups are contributed by saturated amine or alcohol components. Examples of suitable saturated alcohol components are linear monools, diols and polyols of 1 to 14 carbon atoms, branched monools, diols and polyols of 3 to 20 carbon atoms, and cyclic monools, diols and polyols of 3 to 14 carbon atoms, with preference being given to methanol, ethanol, n-propanol, isopropanol, n-butanol, isobutanol and tert-butanol. Examples of suitable amines include primary monoamines, exemplified by $C_1$–$C_{20}$-alkylamines such as n-butylamine, n-hexylamine, 2-ethylhexyl-1-amine and 1-octadecylamine, and amines having cycloaliphatic, heterocyclic or (hetero)aromatic structural elements, such as benzylamine, 1-(3-aminopropyl)imidazole and tetrahydrofurfurylamine. Mention should also be made of compounds having two primary amino groups, examples being $C_1$–$C_{20}$-alkylenediamines such as ethylenediamine, butylenediamine, 1,5-diamino-3-oxopentane etc. Preference is given to secondary amines, examples being di-$C_1$–$C_{20}$-alkylamines, such as diethylamine, di-n-propylamine, di-n-butylamine, diethanolamine, dicyclohexylamine, bis-2- ethylhexylamine, diallylamine and N-ethylethanolamine. Likewise preferred are heterocyclic secondary amines in which the NH group is located on the heterocycle, such as pyrrolidine, piperidine, piperazine, N-methylpiperazine, morpholine and 2,2,6,6-tetramethylpiperidine. Further suitable prepolymers (components A) are ethylenically unsaturated melamine resins, such as the reaction products of melamine/formaldehyde condensates with OH-containing unsaturated compounds, ethylenically unsaturated dicarboxylic anhydrides, or the amides of ethylenically unsaturated monocarboxylic acids. Suitable melamine-formaldehyde condensates are, in particular, hexamethylolmelamine (HMM) and hexamethoxymethylolmelamine (HMMM). Suitable OH-containing unsaturated compounds include, for example, the hydroxy-$C_2$–$C_4$-alkyl esters of ethylenically unsaturated carboxylic acids, especially those of acrylic and methacrylic acid. Other suitable candidates for reaction with HMM are ethylenically unsaturated alcohols, such as allyl alcohol or crotyl alcohol, or ethylenically unsaturated dicarboxylic anhydrides, such as maleic anhydride. In addition, both HMM and HMMM can be modified with amides of ethylenically unsaturated carboxylic acids, such as acrylamide or methacrylamide, to give ethylenically unsaturated melamine resins. Preference is given to melamine derivatives whose ethylenically unsaturated structural units comprise acryloyloxy or methacryloyloxy groups.

Other suitable prepolymers (components A) include unsaturated epoxy resins and epoxy resin derivatives. The latter include, in particular, the products of reaction of epoxy-functional compounds or oligomers with ethylenically unsaturated monocarboxylic acids such as acrylic, methacrylic, crotonic, and cinnamic acid. Instead of or together with the esters of monocarboxylic acids it is also possible to employ the monoesters of ethylenically unsaturated dicarboxylic acids with monoalcohols such as methanol, ethanol, n-propanol, isopropanol, n-butanol, tert-butanol, n-hexanol and 2-ethylhexanol. Suitable epoxy-functional substrates include in particular the polyglycidyl ethers of polyhydric alcohols. These include the diglycidyl ethers of bisphenol A and its derivatives, the diglycidyl ethers of oligomers of bisphenol A as are obtainable by reacting bisphenol A with the diglycidyl ether of bisphenol A, and the polyglycidyl ethers of novolaks. The reaction products of the ethylenically unsaturated carboxylic acids with the glycidyl ethers that are present can be modified with primary or secondary amines. Furthermore, by reacting OH groups in epoxy resins with suitable derivatives of ethylenically unsaturated carboxylic acids, such as the acid chlorides, further ethylenically unsaturated groups can be introduced into the epoxy resin. Ethylenically unsaturated epoxy resins are sufficiently well known to the skilled worker and are obtainable commercially. For further details reference is made to P. K. T. Oldring, pp. 37 to 68 and the literature cited therein. Prepolymers (components A) which are likewise suitable are unsaturated polyester prepolymers or polyester resins, and also the ethylenically modified polyesters that are synthesized by derivatizing the free OH groups in conventional polyesters with α,β-ethylenically unsaturated structural units such as vinyl- or allyl-functional hydroxyalkanes, vinyl or allyl esters of aliphatic, functionalized carboxylic acids, and esters of α,β-ethylenically unsaturated carboxylic acids with diols and polyols, and also the so-called ethylenically unsaturated polyesters that are obtainable by copolycondensation of conventional dicarboxylic acids together with ethylenically unsaturated dicarboxylic acids and/or their anhydrides and low molecular mass diols.

The so-called ethylenically unsaturated polyesters include in particular the copolycondensates of maleic anhydride with at least one further dicarboxylic acid and/or its anhydride, and a low molecular mass diol. In this case, the dicarboxylic acids and their anhydrides are preferably selected from succinic acid, succinic anhydride, glutaric acid, glutaric anhydride, adipic acid, phthalic acid, terephthalic acid, isophthalic acid, and especially phthalic anhydride. Suitable diols are preferably selected from ethylene glycol, 1,2-propylene glycol, 1,4-butanediol, 1,5-pentanediol, neopentyl glycol and 1,6-hexanediol, especially 1,2-propylene glycol.

Suitable hydroxyl-containing polyesters for modification to ethylenically modified polyesters can be prepared in a conventional manner by polycondensation of dibasic or polybasic carboxylic acids with dihydric alcohols and/or with at least one further polyfunctional alcohol component. Suitable carboxylic acid components in this case are aliphatic and/or aromatic $C_3$–$C_{36}$-carboxylic acids, their esters and anhydrides. They include succinic acid, succinic anhydride, glutaric acid, glutaric anhydride, adipic acid, pimelic acid, suberic acid, azelaic acid, sebacic acid, phthalic acid, phthalic anhydride, isophthalic acid, terephthalic acid, tetrahydrophthalic acid, tetrahydrophthalic anhydride, trimellitic acid, trimellitic anhydride, pyromellitic acid, and pyromellitic anhydride. Examples of suitable diol components are ethylene glycol, propylene glycol, 1,4-butanediol, 1,5-pentanediol, neopentyl glycol, 1,6-hexanediol, 2-methyl-1,5-pentanediol, 2-ethyl-1,4-butanediol, dimethylolcyclohexane, diethylene glycol, triethylene glycol, mixtures thereof, and also polyaddition polymers of cyclic ethers, such as polytetrahydrofuran, polyethylene glycol and polypropylene glycol. Suitable polyhydric alcohols are, in particular, trihydric to hexahydric alcohols, such as glycerol, trimethylolethane, trimethylolpropane, trimethylolbutane, pentaerythritol, ditrimethylolpropane, sorbitol, erythritol, and 1,3,5-trihydroxybenzene. In the polycondensation step, if the total number of moles of the OH groups in the alcohol component is greater than the total number of moles of the carboxyl groups in the acid component, the product is a polyester which contains OH groups. These OH groups can be esterified conventionally with the abovementioned ethylenically unsaturated carboxylic acids, especially with acrylic acid and methacrylic acid, in accordance with conventional techniques. An alternative embodiment relates to polyesters formed from diols, dicarboxylic acids and at least one polybasic carboxylic acid. In this case, the hydroxyl groups are introduced into the polyester subsequently, by reacting the carboxylic acid groups with alkylene oxides, such as ethylene oxide or propylene oxide. These alcohol functions can then be etherified or esterified in the manner described above. For further details reference may be made to P. K. T. Oldring, pp. 123 to 135. The abovementioned products are sufficiently well known to the skilled worker and are obtainable commercially. Their number-average molecular weight lies in general within the range from 500 to 10,000 and, preferably, in the range from 800 to 3000.

Other suitable ethylenically modified polyesters are those obtainable by cocondensation of conventional di- or polycarboxylic acids with conventional alcohol components and ethylenically unsaturated monocarboxylic acids, preferably acrylic and/or methacrylic acid. Such polyesters are known, for example, from EP-A 279 303, to which reference is made for further details. In this case, introduction of the ethylenically unsaturated groups into the polyester takes place as early as during the synthesis of the polyester from the low molecular mass components.

Further suitable prepolymers (components A) are (meth) acrylate-based copolymers containing ethylenically unsaturated structural elements. Such ethylenically unsaturated polymers are obtainable in general by means of polymer-analogous reactions of functionalized polymers (polymers FP) having free hydroxyl, carbonyl, carboxyl, isocyanate, amino and/or epoxy groups. In general, the ethylenic double bonds are introduced by reaction with suitable ethylenically unsaturated compounds of low molecular mass that have a functional group which is able to react with the reactive group in the polymer and which, in doing so, gives rise to formation of a bond.

The functionalized polymers P used as starting materials are generally obtainable by free-radical addition polymerization of at least one ethylenically unsaturated monomer having such a functional group and, if desired, other ethylenically unsaturated monomers. In general, the ethylenically unsaturated monomers having a functional group make up from 5 to 50 mol %, preferably from 15 to 40 mol % and, in particular, from 20 to 35 mol % of the total monomers to be polymerized. Examples of monomers having a functional group are the hydroxyalkyl acrylates and methacrylates, such as 2-hydroxyethyl (meth)acrylate, hydroxypropyl (meth)acrylate and 4-hydroxybutyl (meth)acrylate, aminoalkyl acrylates and methacrylates, such as 2-aminoethyl (meth)acrylate, carbonyl compounds, such as acrolein, methacrolein, vinyl ethyl ketone, N,N-diacetonylacrylamide and -methacrylamide, vinyl isocyanate, dimethyl-3-isopropenylbenzyl isocyanate, 4-isocyanatostyrene, and isocyanates of ethylenically unsaturated carboxylic acids, e.g., methacryloyl isocyanate, ω-isocyanatoalkyl (meth) acrylates, glycidyl compounds, such as glycidyl allyl ether and glycidyl methallyl ether, the glycidyl esters of ethylenically unsaturated carboxylic acids, such as glycidyl (meth) acrylate, ethylenically unsaturated anhydrides, such as maleic anhydride and methacrylic anhydride, and the amides of ethylenically unsaturated carboxylic acids, such as acrylamide and methacrylamide. Suitable comonomers are generally selected from the esters of acrylic and methacrylic acid and, if desired, from vinylaromatic compounds. Examples of suitable comonomers are the $C_1$–$C_4$ acrylates and methacrylates, such as methyl, ethyl, n-propyl, isopropyl, n-butyl, isobutyl and tert-butyl (meth)acrylates. Further suitable comonomers are styrene, 1-methylstyrene, 4-tert-butylstyrene, and 2-chlorostyrene. To a minor extent it is also possible to use monomers such as vinyl acetate, vinyl propionate, vinyl chloride, vinylidene chloride, conjugated dienes, such as butadiene and isoprene, vinyl ethers of $C_1$–$C_{20}$-alkanols, such as vinyl isobutyl ether, acrylonitrile, methacrylonitrile, and heterocyclic vinyl compounds, such as 2-vinylpyridine and N-vinylpyrrolidone. In one preferred embodiment the comonomers comprise at least one monomer selected from the esters of methacrylic acid, especially methyl methacrylate, and at least one further comonomer selected from the alkyl esters of acrylic acid and/or styrene.

The ethylenically unsaturated compounds having a functional group which are suitable for the polymer-analogous reaction are preferably selected from the abovementioned ethylenically unsaturated monomers having a functional group. A precondition is that the functionality of the ethylenically unsaturated compound is able to react with the functionalities on the polymer and, in doing so, to give rise to formation of a bond with the polymer. Suitable types of reaction in this context are condensation and addition reactions. Examples of suitable pairs of functionalities are those such as isocyanate/hydroxyl, isocyanate/amino, anhydride/hydroxyl, anhydride/amino, carbonyl/amino, carboxylic chloride/hydroxyl, glycidyl/hydroxyl, glycidyl/amino or amido, and glycidyl/carboxyl. In one preferred embodiment the ethylenically unsaturated polymer is obtainable by reacting a functionalized polymer which has glycidyl groups with ethylenically unsaturated compounds that contain hydroxyl groups, especially the hydroxyalkyl esters of the abovementioned ethylenically unsaturated carboxylic acids, an example being 2-hydroxyethyl acrylate. Examples of such ethylenically unsaturated polymers are given in EP-A 650 979, the full extent of the disclosure of which is incorporated herein by way of reference.

Component B of the radiation-curable formulation is at least one difunctional ester of α,β-ethylenically unsaturated carboxylic acids with diols having a linear alkylene chain which has 7 to 14 carbon atoms. In general, such difunctional olefinically unsaturated esters of low molecular mass are referred to as reactive diluents. Their low viscosity makes it possible to obtain low-solvent and, in particular, solvent-free formulations, based on prepolymers, which nevertheless have good applications properties. In the course of radiation-induced curing, the reactive diluents are incorporated into the coating, where their difunctionality gives them an additional crosslinking action.

The reactive diluents (component B) are of the formula I:

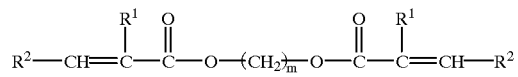

where $R^1$ independently at each occurrence is H, $CH_3$ or $CH_2$-COOX, $R^2$ independently at each occurrence is H, $CH_3$ or COOX, X is $C_1$–$C_{12}$-alkyl, and m is an integer from 7 to 14.

Accordingly, the α,β-ethylenically unsaturated carboxylic acids of component B can be selected, independently of one another, from monocarboxylic acids, such as acrylic, methacrylic and crotonic acid, and from dicarboxylic acids, such as maleic and fumaric acid. Also suitable are vinylacetic, mesaconic and citraconic acids, although particular preference is given to acrylic and methacrylic acid. In accordance with the formula I, the ester-forming diols are preferably selected from linear α,ω-diols having alkylene groups which contain 7 to 14 carbon atoms, such as 1,7-heptanediol, 1,8-octanediol, 1,9-nonanediol, 1,10-decanediol, 1,11-undecanediol, 1,12-dodecanediol, 1,13-tridecanediol, and 1,14-tetradecanediol. Preference is given to 1,8-octanediol, 1,9-nonanediol, 1,10-decanediol, and 1,12-dodecanediol, and particular preference to 1,10-decanediol. Particularly preferred components B, accordingly, are 1,8-octanediol diacrylate, 1,9-nonanediol diacrylate, 1,10-decanediol diacrylate and 1,12-dodecanediol diacrylate, and also 1,8-octanediol dimethacrylate, 1,9-nonanediol dimethacrylate, 1,10-decanediol dimethacrylate, and 1,12-dodecanediol dimethacrylate.

The radiation-curable formulations of the invention can be present in the form of liquid or flowable formulations of the components A and B, as solutions or dispersions, for example, and, provided the components are liquid, can also be present in pure form.

In addition, it can also be present in the form of pulverulent formulations as used, for example, for the powder coating of metallic surfaces. Also suitable are hotmelt formulations, which acquire the ability to flow only at elevated temperature. Depending on the type of recipe, the radiation-curable formulations comprise customary auxiliaries, such as thickeners, leveling assistants, defoamers, UV stabilizers, emulsifiers and/or protective colloids, and fillers. Suitable auxiliaries are known to the skilled worker from paint and coating technology. Suitable fillers, especially for aqueous dispersions of components A and B, include silicates obtainable by hydrolysis of silicon tetrachloride (Aerosil® from Degussa), siliceous earth, talc, aluminum silicates, magnesium silicates, calcium carbonates, etc. Suitable stabilizers embrace typical UV absorbers, such as oxanilides, triazines, benzotriazoles (obtainable as Tinuvin® grades from Ciba Geigy), and benzophenones. These can be employed in combination with customary free-radical scavengers, examples being sterically hindered amines, such as 2,2,6,6-tetramethylpiperidine and 2,6-di-tert-butylpiperidine (HALS compounds). Stabilizers are employed customarily in amounts from 0.1 to 5.0 and, preferably, from 0.5 to 2.5% by weight, based on the polymerizable components of the formulation.

Insofar as curing takes place by means of UV radiation, the formulations for use in accordance with the invention include at least one photoinitiator. A distinction can be made here between photoinitiators for free-radical curing mechanisms (addition polymerization of ethylenically unsaturated double bonds) and photoinitiators for cationic curing mechanisms (cationic addition polymerization of ethylenically unsaturated double bonds or of compounds that include epoxy groups). When curing is carried out by means of irradiation with high-energy electrons (electron beam curing) the use of photoinitiators can be omitted. When electron beam curing is employed, the formulations of the invention may also comprise colored pigments.

Suitable photoinitiators for cationic photopolymerizations, i.e., the polymerization of vinyl compounds or compounds that include epoxy groups, are, for example, aryldiazonium salts, such as 4-methoxybenzenediazonium hexafluorophosphate, benzenediazonium tetrafluoroborate and toluenediazonium tetrafluoroarsenate, aryliodonium salts, such as diphenyliodonium hexafluoroarsenate, arylsulfonium salts, such as triphenylsulfonium hexafluorosphosphate, benzene- and toluenesulfonium hexafluorophosphate, and bis[4-diphenylsulfoniophenyl] sulfide bishexafluorophosphate, disulfones, such as diphenyl disulfone and phenyl 4-tolyl disulfone, diazodisulfones, imidotriflates, benzoin tosylates, isoquinolinium salts, such as N-ethoxyisoquinolinium hexafluorophosphate, phenylpyridinium salts, such as N-ethoxy-4-phenylpyridinium hexafluorophosphate, picolinium salts, such as N-ethoxy-2-picolinium hexafluorophosphate, ferrocenium salts, titanocenes, and titanocenium salts.

The photoinitiators are employed in amounts from 0.05 to 20% by weight, preferably from 0.1 to 10% by weight and, in particular, from 0.1 to 5% by weight, based on the polymerizable componets of the formulations of the invention.

Formulations of the invention are found to be particularly suitable for coating substrates such as wood, paper, plastic surfaces, mineral building materials such as molded cement slabs and fiber cement slabs, and, in particular, coated and uncoated metals.

The present invention, accordingly, also provides a process for coating substrates, especially coated or uncoated metals, and the coated substrates obtainable by this process. The substrates are generally coated by applying the desired thickness of at least one radiation-curable formulation of the invention to the substrate that is to be coated, removing any solvent present, and then curing the applied formulation by exposure to high-energy radiation such as UV radiation or electron beams. If desired, this procedure can be repeated one or more times. The radiation-curable formulations are applied to the substrate in a known manner, for example, by spraying, troweling, knife coating, brushing, rolling or pouring. The coating thickness is generally in the range from 3 to 500 g/m$^2$ and, preferably from 10 to 200 g/m$^2$, corresponding to wet film thicknesses from about 3 to 500 µm, preferably from 10 to 200 µm. Application can take place either at room temperature or at elevated temperature, but preferably not above 100° C. Subsequently, the coatings are cured by exposure to high-energy radiation, preferably UV radiation with a wavelength from 250 to 400 nm, or high-energy electrons (electron beams; from 150 to 300 keV). Examples of UV sources used are high-pressure mercury vapor lamps, such as CK or CK1 lamps from IST. The radiation dose usually sufficient for crosslinking in the case of UV curing lies within the range from 80 to 3000 mJ/cm$^2$.

In one preferred process, curing takes place continuously by conveying the substrate, treated with the formulation of the invention, past a radiation source at a constant rate. This requires the curing rate of the formulation of the invention to be sufficiently high.

Because of their high reactivity, the formulations of the invention are easy to process. They are particularly suitable for coating the abovementioned substrates, and give rise to coatings having high mechanical strength, high weathering stability and high chemical resistance.

Accordingly, the present invention additionally provides for the use of the radiation-curable formulations of the invention for coating substrates, especially their use as topcoats, or for preparing topcoats, for multicoat automotive finishing systems.

The examples given below are intended to illustrate the present invention but without restricting it.

EXAMPLES

I. Preparing the Radiation-curable Formulations
1.) Preparing the formulations B1, B2 and B3 of the invention 4% by weight of the photoinitiator Darocure 1173 (Ciba-Geigy) and 30 parts of the reactive diluents of the invention are added in each case to portions of 70 parts of a urethane acrylate prepared by reacting 75% of the isocyanate groups of the isocyanurate of hexamethylene diisocyanate with hydroxyethyl acrylate and 25% of NCO groups with methanol. In this way, Example B1 is obtained with 1,10-decanediol diacrylate, Example B2 with 1,8-octanediol diacrylate and Example B3 with 1,9-nonanediol diacrylate.

2.) Preparing the formulation B4 of the invention 50 parts of 1,10-decanediol diacrylate and 4% by weight of the photoinitiator Darocure 1173 (Ciba-Geigy) are added to 50 parts of urethane acrylate prepared by reacting 75% of the isocyanate groups of the isocyanurate of hexamethylene diisocyanate with hydroxyethyl acrylate and 25% of the isocyanate groups with methanol.

3.) Preparing Comparative Example CB1

The preparation is as described under 1.), but using 1,6-hexanediol diacrylate as reactive diluent.

4.) Preparing Comparative Example CB2

The preparation is as described under 2.), but using 1,6-hexanediol diacrylate as reactive diluent.

The radiation-curable formulations described under 1.) to 4.) are flowable at room temperature and have viscosities <10 Pas.

5.) Preparing Comparative Example CB3

The formulation is prepared as under 1.), but using 4-tert-butylcyclohexyl acrylate as reactive diluent. The resultant formulation, CB3, is turbid owing to the incompatibility of the components and is therefore unsuitable as a radiation-curable formulation, in particular as a clearcoat.

II. Determining the Reactivity and Mechanical Properties of Cured Coatings of the Formulations B1, B2, B3 and CB1

1.) Determining the reactivity

The reactivity is stated in m/min and corresponds to the rate at which a substrate treated with a radiation-curable formulation in a wet film thickness of 100 μm can be conveyed at a distance of 10 cm past a UV source with an output of 120 W/cm such that complete curing still takes place. Complete curing is tested with the fingernail test. The rate reported is the fastest rate at which no impressions are left in the coating when scratched with the fingernail. The results are summarized in Table 1.

2.) Determining the coating hardness

The coating hardness was characterized by determining the pendulum attenuation in accordance with DIN 53157. For this purpose, the radiation-curable compositions of the inventive and comparative examples were applied with a wet film thickness of 100 μm to glass. The resultant sample was cured by passing it twice at a distance of 10 cm in front of a high-pressure mercury vapor lamp (120 W/cm) with a belt speed of 10 m/min. Subsequently, the pendulum attenuation is determined using a pendulum instrument in accordance with DIN 53157 (König). The result is given in seconds. The results are summarized in Table 1.

3.) Determining the flexibility

The flexibility of the coating was determined by measuring the Erichsen indentation in accordance with DIN 53156. This was done by applying the respective formulation in a wet film thickness of 50 μm to BONDER panel 132 using a spiral-wound coating bar. Curing was carried out in the manner described above by exposure with a high-pressure mercury vapor lamp (120 W/cm). Subsequently, the Erichsen indentation was determined by pressing a metal ball into the uncoated side of the metal panel (DIN 53156). The results are summarized in Table 1.

TABLE 1

| Example | Reactivity [m/min] | Pendulum attenuation [sec] | Erichsen indentation [mm] |
|---|---|---|---|
| B1 | 15 | 145 | 3.4 |
| B2 | 15 | 154 | 2.4 |
| B3 | 15 | 153 | 2.0 |
| CB1 | 15 | 149 | 1.5 |

III. Compatibility Testing of the Radiation-curable Formulations B1 and CB1 on plastics surfaces An important field of application of radiation-curable formulations is the protection of plastics surfaces against weathering. In this field it is an advantage for the plastics surface to be attacked as little as possible by the formulations. To determine the compatibility, the formulations B1 and CB1 are gripped onto surfaces of polymethyl methacrylate (PMMA) and acrylonitrile-polystyrene-acrylate copolymer (Luran S) and the alteration (surface damage) of the surfaces is assessed as a function of time (see Table 2).

TABLE 2

| Surface | Exposure time | Assessment of surface damage B1 | CB1 |
|---|---|---|---|
| PMMA | 1 h | none | slight incipient swelling |
|  | 2 h | none | formation of an annular margin |
|  | 3 h | none | incipient swelling |
| Luran S | 1 h | slight incipient dissolution | severe incipient dissolution |
|  | 2 h | slight incipient dissolution | severe incipient dissolution |
|  | 3 h | slight incipient dissolution | fully corroded |

IV. Determining the Chemical Resistance of the Cured Coatings of the Formulations B1 and CB1 and B4 and CB2

In order to assess the chemical resistance, coatings of the formulations B1, CB1, B4 and CB2 were prepared as described below and then various chemicals were applied to the surfaces of the coatings and left to act for 24 hours in each case at different temperatures. The temperature stated is the upper temperature starting from which damage to the coating surface is observed.

TABLE 3

| Chemical | B4[1) ] [° C.] | CB2[1)] [° C.] |
|---|---|---|
| Sulfurous acid (6%) | 70 | 66 |
| Pancreatin + H$_2$O | 77 | 77 |
| Sodium hydroxide solution (5%) | 77 | 49 |
| Sulfuric acid (10%) | 63 | 56 |
| Water | 77 | 77 |

[1)]Formulations B4 and CB2 were applied with a wet film thickness of 100 μm to a substrate, exposed with a high-pressure mercury lamp (120 W/cm) at a rate of 10 m/min, then heated to 100° C. and again exposed at a rate of 10 m/min.

Formulations B4 and CB2 were applied with a wet film thickness of 100 μm to a substrate, exposed with a high-pressure mercury lamp (120 W/cm) at a rate of 10 m/min, then heated to 100° C. and again exposed at a rate of 10 m/min.

We claim:

1. A radiation-curable formulation, comprising:
   (i) at least one prepolymer which comprises at least two olefinic double bonds per molecule selected from the group consisting of prepolymers with urethane and/or urea groups prepared by reacting compounds having three or more isocyanate groups with α,β-ethylenically unsaturated compounds having at least one isocyanate-reactive group, (component A), and
   (ii) at least one diester of α,β-ethylenically unsaturated carboxylic acids with diols having a linear alkylene chain which has 7 to 14 carbon atoms (component B).

2. A formulation as claimed in claim 1, where component B is an ester of the formula I

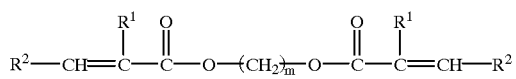

where R$^1$ independently at each occurrence is H, CH$_3$ or CH$_2$-COOX, $R^2$ independently at each occurrence is H, $CH_3$ or COOX, x is $C_1$–$C_{12}$-alkyl, and m is an integer from 7 to 14.

3. The formulation as claimed in claim 1, wherein component A is an at least difunctional melamine (meth)acrylate.

4. A multicoat automotive finishing formulation comprising the radiation-curable formulation as claimed in claim 1.

5. A process for coating a substrate, which comprises applying a radiation-curable formulation as claimed in claim 1 to the substrate that is to be coated and then curing the applied coating by radiation with ultraviolet or electron beams.

6. A coated substrate prepared by the process as claimed in claim 5.

7. A substrate coated with the radiation-curable formulation as claimed in claim 1.

8. The substrate as claimed in claim 7, wherein said substrate is a metal or a metal having a coating thereon.

9. A hardened coating prepared by radiation curing an applied coating of the radiation-curable formulation as claimed in claim 1 applied to a substrate.

10. A radiation-curable formulation, comprising:
   (i) at least one prepolymer which comprises at least two olefinic double bonds per molecule selected from the group consisting of prepolymers with urethane and/or urea groups prepared by reacting a hydroxyalkyl (meth) acrylate with a trifunctional isocyanate, (component A), and (ii) at least one diester of α,β-ethylenically unsaturated carboxylic acids with diols having a linear alkylene chain which has 7 to 14 carbon atoms (component B).

11. A formulation as claimed in claim 10, where the trifunctional isocyanate is selected from isocyanurates and biurets of difunctional isocyanates.

* * * * *